July 28, 1925.  1,548,013

W. E. FOWLER, JR

SECURING BRAKE BEAM SUPPORTS TO TRUCKS

Filed Sept. 2, 1924      3 Sheets-Sheet 1

WITNESSES

INVENTOR

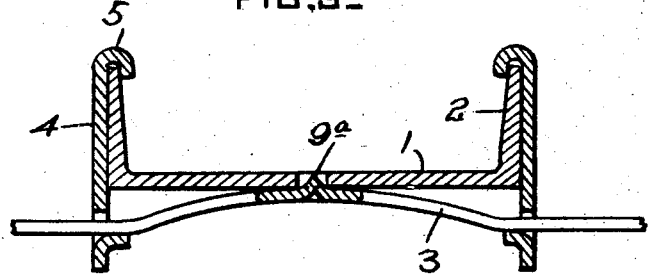
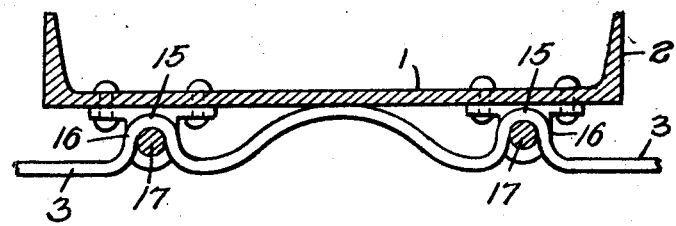
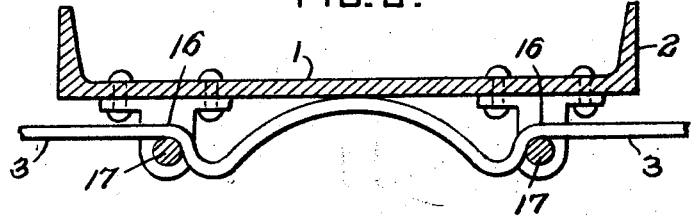

July 28, 1925. 1,548,013
W. E. FOWLER, JR
SECURING BRAKE BEAM SUPPORTS TO TRUCKS
Filed Sept. 2, 1924 3 Sheets-Sheet 3
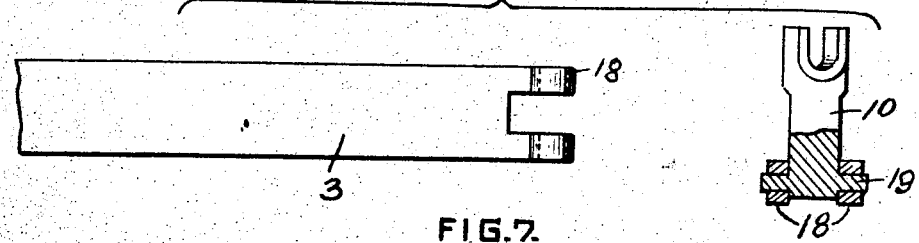
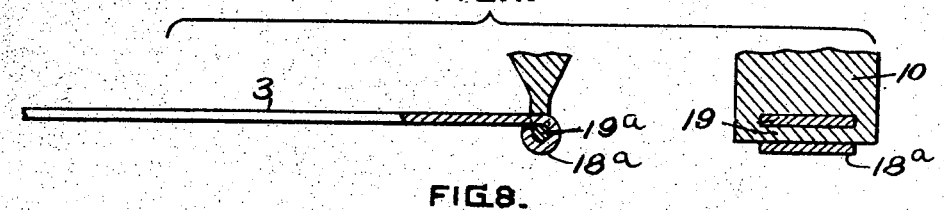
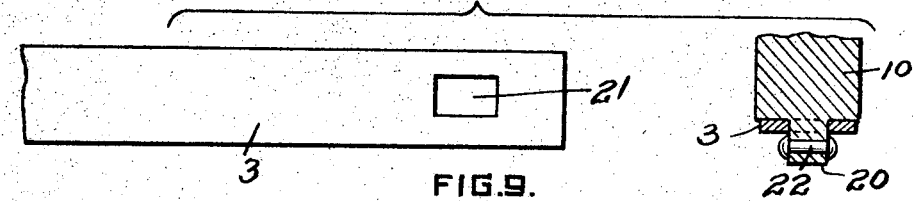
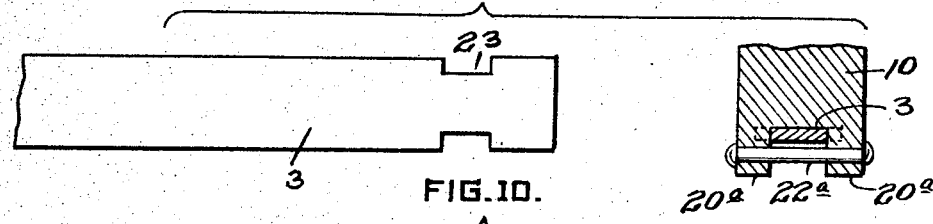
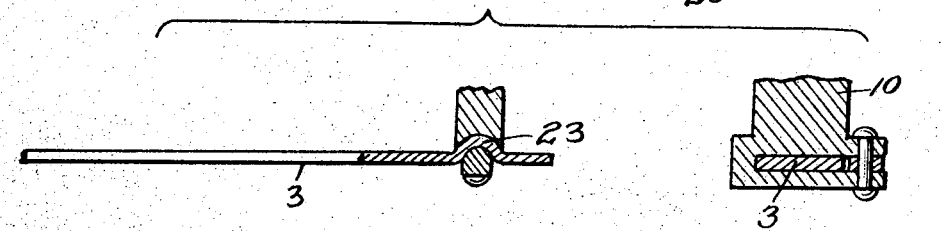
INVENTOR
William E Fowler
by Dennis Wolcott
att,
WITNESSES
J. Herbert Bradley.

Patented July 28, 1925.

1,548,013

UNITED STATES PATENT OFFICE.

WILLIAM E. FOWLER, JR., OF MOUNT LEBANON, PENNSYLVANIA, ASSIGNOR TO DAVIS BRAKE BEAM COMPANY, OF JOHNSTOWN, PENNSYLVANIA, A CORPORATION OF PENNSYLVANIA.

SECURING BRAKE-BEAM SUPPORTS TO TRUCKS.

Application filed September 2, 1924. Serial No. 735,417.

*To all whom it may concern:*

Be it known that I, WILLIAM E. FOWLER, Jr., residing at Mount Lebanon, in the county of Allegheny and State of Pennsylvania, a citizen of the United States, have invented or discovered certain new and useful Improvements in Securing Brake-Beam Supports to Trucks, of which improvements the following is a specification.

The invention described herein relates to certain improvements in the manner of attaching brake beam supporting rails to a part or member of a railway truck, as for example, to the spring plank, and has for its object a construction whereby the rails may be attached to the plank without change in the latter, or only such change as will not affect the integrity or strength of the latter. The invention is hereinafter more fully described and claimed.

Figure 1:
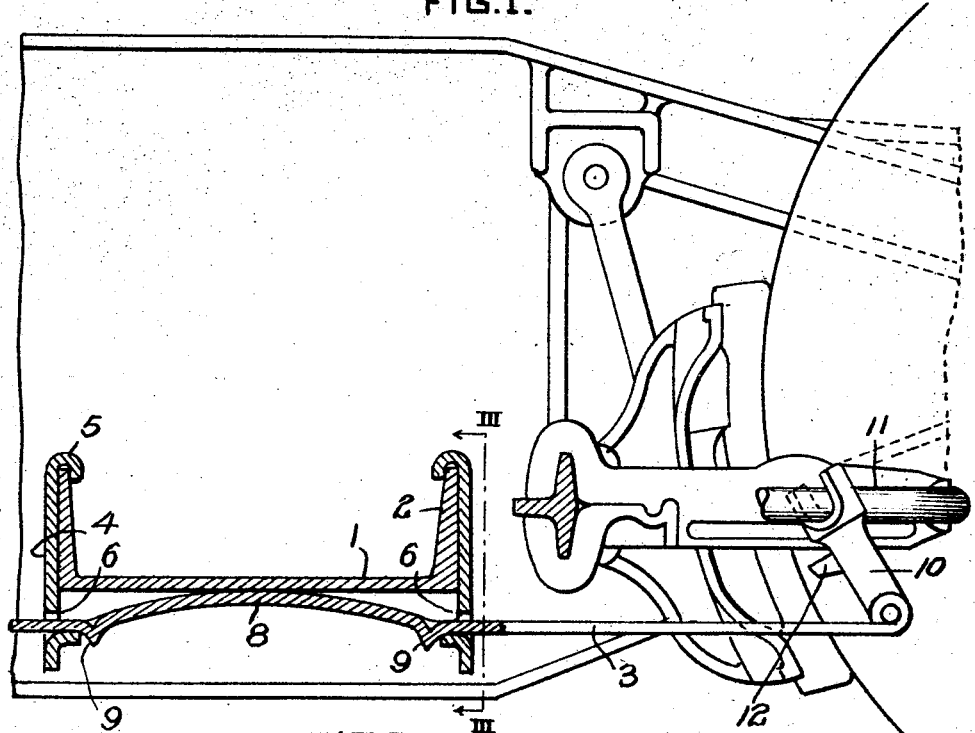
Figure 3:
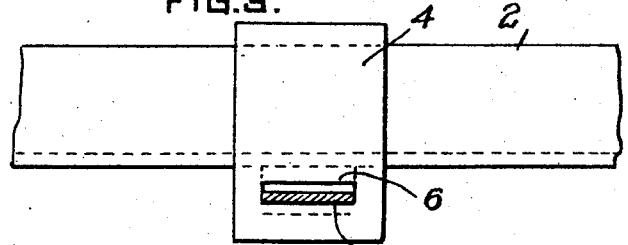
Figure 2:
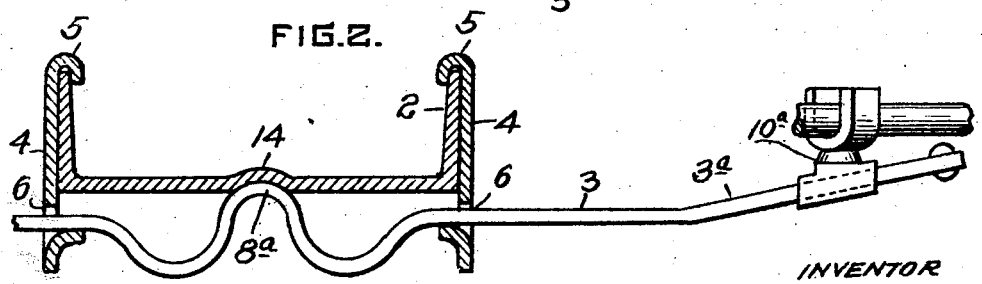

In the accompanying drawings forming a part of this specification, Fig. 1 is a portion of a truck and brake rigging and also showing the improved means for attaching the brake beam supporting rail to the spring plank of the truck; Fig. 2 illustrates a modification in the manner of attaching the rail to the spring plank; Fig. 3 is a sectional view on a plane indicated by the line III—III, Fig. 1; Fig. 3ª is a sectional view illustrating a modification of the construction shown in Fig. 1; Figs. 4 and 5 are sectional views illustrating modified embodiments of the construction shown in Fig. 1; and Figs. 6 to 10 are detail views illustrating several ways in which the carrier block can be connected to the supporting rail when employing the construction shown in Fig. 1.

In the construction shown in Fig. 1 the supporting rail 3 is suspended from a member of the truck, as for example the spring plank 1, by hangers 4 adapted to be detachably connected to such member. When the spring plank is channel-shaped as shown, the hangers are provided with hooks adapted to engage the flanges 2 of the spring plank. These hangers extend below the plank, and through the portions below the plank are formed slots 6 through which is passed the supporting rail 3 which is formed of resilient material.

The portions of the rail 3 intermediate of the points where the rails bear upon the lower wall of the slot 6 in the hangers, is bent upwardly, the curve being such that the highest point of the curved portion. 8 will bear against the underside of the spring plank and the curved portion, when the several parts are in position, will be placed under considerable tension. In applying the rails to the spring plank, the hangers are passed onto the same and one hanger is connected to a flange 2 of the spring plank. Then the opposite portion of the rail is forced upwardly to permit of the hook of the second hanger being hooked to the other flange of the spring plank; the slots 6 in the hanger are so located as to permit of this upward movement of one portion of the rail to effect the engagement of the hook in the spring plank. In other words, the top of the slot should be at a distance below the bottom of the spring plank equal to a depth of the hook. It is preferred that in forming the slots of the hangers the metal displaced should be so bent as to form comparatively long seats or bearings for the rails. While it is believed that the pressure of the rail at the three points, i. e., the underside of the spring plank and the bottoms of the slots in the hangers, will be sufficient to prevent any longitudinal movement of the rail, such movement can be effectually prevented by forming a nib or projection 9 on the rail for engagement with a hole or depression in the spring plank, as shown in Figs. 3ª. As an alternative construction, nibs or projections 9ª may be so formed in the rail as to bear against the tongues formed on the hangers as shown in Fig. 1.

In the construction shown in Fig. 1 the portions of the rail extending on opposite sides of the spring plank, are made straight and to these projections of the rails are pivotally mounted carriers 10. These carriers are provided at their upper ends with open topped slots or seats for the reception of the tension member 11 of the brake beam of the brake rigging and when the parts of the brake rigging and supporting rails are properly assembled, these carriers will be inclined inwardly, the inclination being dependent upon the movement of the beam in applying the shoes, so that when the brake beam moves forward to apply the shoe, the outer end of the carrier will move up so as to maintain proper relation between the front and rear portions of the brake beam when shifted to apply the shoes to the wheels.

As is well known in the art, the turning down of the wheels, as is now the practice, will necessitate a greater vertical movement of the brake beam when applying the shoes and when releasing same, hence the normal inclination of the carriers should be such that when being swung up from its normal inclination, it will, when it reaches a vertical position, have carried up the outer end of the brake beam a distance required for the smallest diameter of the wheel. As it is possible that the brake beam may move back or to the left in Fig. 1, sufficiently far to move the tension member out of the slot or seat in the carrier, provision is made by a stop 12 to limit the dropping of the carrier, so that when the brake beam is moved forward again, the tension member will enter the slot.

In the construction shown in Fig. 2 the portion of the rail intermediate the points of support by the hangers are reversely curved, the intermediate loop 8ª being adapted to bear on the underside of the spring plank, while the curves on the opposite sides of the loop 8ª extend down below the points of support by the hangers. In this construction provision may be made to prevent the longitudinal movement of the rails by forming a depression or seat 14 on the underside of the spring plank with which the loop 8ª will engage.

In Figs. 4 and 5 are shown modifications of the means whereby the rail may be attached to the underside of the spring plank. In Fig. 4 the supporting rail is provided with spaced loops 15 and with a reversely curved portion 8ᵇ intermediate the loops. To the underside of the spring plank are secured hangers in the form of brackets 16 spaced distances apart approximately equal to the width of the rail and having holes therein for the reception of pins 17 which are passed through the loops. The portion intermediate the loops is, as stated, reversely curved, and bears at one point on the underside of the plank, such point being intermediate the pair of hangers or brackets 16. This portion is made resilient and is so formed that when bearing at one point, as stated, upon the underside of the spring plank, the loops will be held away from their operative or normal position as shown in Fig. 4 and must be forced upward in order to bring them into position permitting of the passage of the pins 17 through the loops and holes in the brackets.

In Fig. 5 is shown a construction substantially similar to that shown in Fig. 4, except that only half loops 7ª are formed for engagement with the supporting pins 11.

In the construction shown in Figs. 1 and 6 the connection of the carrier to the rail 3 is effected by forming a slot in the end of the rail for the reception of the end of the carrier and the ends of the prong formed by slotting the rails are turned over to form eyes 18 for the reception of the trunnion 19 on the carrier. In the construction shown in Fig. 7, the lower end of the carrier 10 is slotted and the portion 18ª forming the lower wall of the slot is rounded so as to form a bearing for the eye 19ª formed in the end of the rail 3. In Fig. 8 is shown a construction in which the carrier 10 is provided at its lower end with a projection 20 adapted to pass through the slot 21 in the rail 3, said slot being formed sufficiently large to permit of the tilting movement of the carrier. The parts are held together by means of a pin 22 passing through the projection below the rail.

In the construction shown in Fig. 9, the lower end of the carrier is provided with two lugs 20 adapted to extend through notches 23 in the edge of the rail 3, said notches being sufficiently large to permit the swinging movement of the carrier on the rail, the rail and carrier being held in operative position by a pin 22ª.

In the construction shown in Fig. 10, the lower portion of the carrier is slotted, the slot extending through one side to permit of the sliding of the carrier onto the rail 3. The slot is curved transversely and the lower inner surface of the wall of the slot is curved as shown for the reception of a curved portion 23 of the rail.

In lieu of employing a pivotal carrier as shown in Fig. 1, the outer portions of the rail 3 may be upwardly inclined as shown in Fig. 2 and in lieu of a pivotal carrier, the latter may consist of a base 10ª having its lower portion slotted for the reception of the inclined portion of the rail and provided with an open top seat for the reception of the tension member of the brake beam. It is preferred that the portion of the shoe adapted to engage and form a seat for the tension member should be pivotally mounted on a base 10ª, as described and claimed in an application filed by me May 15, 1924, Serial No. 713,560.

It is characteristic of the improvement described and claimed herein that the supporting rail can be detached from the plank without the use of tools. In one case a portion of the rail can be forced up sufficiently to permit of the hook of one hanger being lifted above the flange of the plank, and in the other construction it is only necessary to drive out the pins supporting the rail. A rail can be placed in position by a reversal of these operations. As the carriers have open topped seats, the latter will drop out of engagement with the beam as soon as it is released from the plank.

I claim herein as my invention:

1. The combination of the spring plank of a car truck, hangers or rail supporting members depending from the spring plank, a brake beam supporting rail arranged transversely of the plank and supported by the hangers and having the portion intermediate the hangers resilient and constructed to bear yieldingly on the plank and hangers, and brake beam carriers movably mounted on the supporting rail.

2. The combination of the spring plank of a car truck, a resilient brake beam supporting rail arranged below and transversely of the plank, hangers detachably connected to the plank and provided with seats or bearings for the rail spaced a suitable distance below the plank, the portion of the rail intermediate its points of bearing on the hangers being so shaped that said rail will bear yieldingly on the plank and hangers.

3. The combination of the spring plank of a car truck, a resilient brake beam supporting rail arranged below and transversely of the plank, hangers detachably connected to the plank and provided with seats or bearings for the rails spaced a suitable distance below the plank, the portion of the rail intermediate its points of bearing on the hangers being so shaped that said rail will bear yieldingly on the plank and hangers, and means for holding the rail as against longitudinal and lateral movements.

4. The combination of the spring plank of a car truck, a resilient brake beam supporting rail arranged below and transversely of the plank, hangers detachably connected to the plank and provided with seats or bearings for the rail spaced a suitable distance below the plank and the portions of the rail intermediate its points of bearing on the hangers being so shaped that said rail will bear yieldingly on the plank and hangers, the plank and rail being so constructed as to engage one with the other.

5. The combination of the spring plank of a car truck, a resilient brake beam supporting rail arranged below and transversely of said plank, hangers extending down on opposite sides of the plank and provided with detachable means for connection with the plank, and having seats or bearings for the rails located suitable distances below the plank, the portion of the rail intermediate the hangers being so shaped that the rail will bear yieldingly on the plank and hangers.

6. The combination of the spring plank of a car truck, a resilient brake beam supporting rail arranged below and transversely of said plank hangers extending down on opposite sides of the plank and provided with detachable means for connection with the plank, said hangers being slotted for the reception of the rail at points suitable distances below the plank, the portion of the rail intermediate the hangers being so constructed that the rail will yieldingly bear on the plank and hangers.

7. The combination of a channel shaped spring plank, hangers provided with hooks adapted to engage the flanges and slotted at suitable distances below the plank, a resilient beam supporting rail passing thru the slots in the hangers and having the portion intermediate the hangers so constructed that the rail will bear yieldingly on the plank and hangers.

8. The combination of the spring plank of a truck, a supporting rail detachably connected to the plank and extending suitable distances on opposite sides of the plank, a carrier movably mounted on the rails and provided with an open topped seat for the reception of a portion of a brake beam.

9. The combination of the spring plank of a car truck, a resilient supporting rail arranged below and extending horizontally on opposite sides of the plank, means for detachably connecting the rail to the plank, and carriers pivotally connected to the rail and having open topped seats for the reception of a portion of a brake beam.

In testimony whereof, I have hereunto set my hand.

WILLIAM E. FOWLER, Jr.